United States Patent
Xhafa et al.

(10) Patent No.: US 9,203,551 B2
(45) Date of Patent: Dec. 1, 2015

(54) WIRELESS NETWORK WITH POWER AWARE TRANSMISSION CONTROL

(71) Applicant: TEXAS INSTRUMENTS INCORPORATED, Dallas, TX (US)

(72) Inventors: Ariton E. Xhafa, Plano, TX (US); Soon-Hyeok Choi, Allen, TX (US); Yanjun Sun, San Diego, CA (US); Leonardo William Estevez, Rowlett, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 218 days.

(21) Appl. No.: 13/891,943

(22) Filed: May 10, 2013

(65) Prior Publication Data

US 2013/0301453 A1    Nov. 14, 2013

Related U.S. Application Data

(60) Provisional application No. 61/645,395, filed on May 10, 2012.

(51) Int. Cl.
*H04L 12/26* (2006.01)
*H04L 1/00* (2006.01)

(52) U.S. Cl.
CPC ............... *H04L 1/0007* (2013.01); *Y02B 60/50* (2013.01)

(58) Field of Classification Search
USPC .......... 370/252–311, 328–338; 455/522–574; 709/217–231
See application file for complete search history.

(56) References Cited

U.S. PATENT DOCUMENTS

| | | | |
|---|---|---|---|
| 7,310,349 B2* | 12/2007 | Beshai | 370/428 |
| 7,380,145 B2* | 5/2008 | Albulet | 713/320 |
| 7,646,754 B2* | 1/2010 | McLaughlin et al. | 370/338 |
| 8,560,026 B2* | 10/2013 | Chanterac | 455/574 |
| 2007/0124412 A1* | 5/2007 | Narayanaswami et al. | 709/217 |
| 2007/0253352 A1* | 11/2007 | Arisha et al. | 370/328 |
| 2010/0093279 A1* | 4/2010 | Linsky et al. | 455/41.2 |
| 2011/0019669 A1* | 1/2011 | Ma et al. | 370/389 |
| 2013/0286913 A1* | 10/2013 | Chanterac | 370/311 |
| 2013/0347083 A1* | 12/2013 | Baum et al. | 726/5 |

\* cited by examiner

*Primary Examiner* — Man Phan
(74) *Attorney, Agent, or Firm* — Steven A. Shaw; Charles A. Brill; Frank D. Cimino

(57) ABSTRACT

A wireless device that tailors communications based on power parameters of the device. In one embodiment, a wireless device includes an energy source, a power monitor coupled to the energy source, a wireless transceiver, and a traffic controller coupled to the power monitor and the wireless transceiver. The power monitor is configured to measure a parameter of the energy source. The wireless transceiver is configured to wirelessly communicate via a wireless network. The traffic controller is configured to set length of packets to be transmitted based on the measured parameter of the energy source.

18 Claims, 2 Drawing Sheets

WIRELESS NETWORK WITH POWER AWARE TRANSMISSION CONTROL

CROSS-REFERENCE TO RELATED APPLICATION

The present application claims priority to U.S. Provisional Patent Application No. 61/645,395, filed on May 10, 2012; which is hereby incorporated herein by reference in its entirety.

BACKGROUND

Wireless Sensor Networks (WSNs) are used in various application areas, including industrial process monitoring and control, environment and habitat monitoring, traffic control, building automation, healthcare applications, etc. In some such applications a powered sensor may be used in a harsh environment, and it is desirable for the sensor to be untethered after deployment for as long as possible. However, most sensors are powered by batteries, and limited battery capacity is a major limitation for deployment of untethered sensor nodes. Finite sensor node lifetime implies finite lifetime of the applications or additional cost and complexity to replace batteries.

SUMMARY

A wireless network and device that tailor communications based on power parameters of the device are disclosed herein. In one embodiment, a wireless device includes an energy source, a power monitor coupled to the energy source, a wireless transceiver, and a traffic controller coupled to the power monitor and the wireless transceiver. The power monitor is configured to measure a parameter of the energy source. The wireless transceiver is configured to wirelessly communicate via a wireless network. The traffic controller is configured to set length of packets to be transmitted based on the measured parameter of the energy source.

In another embodiment, a method includes measuring, by a wireless device, a parameter of an energy source powering the wireless device. A length of a packet to be transmitted is determined based on the measured parameter of the energy source. The packet is transmitted via a wireless network.

In a further embodiment, a wireless device includes an energy source, a power monitor coupled to the energy source, a wireless transceiver, and a traffic controller coupled to the power monitor and the wireless transceiver. The power monitor is configured to measure a parameter of the energy source. The wireless transceiver is configured to wirelessly communicate via a wireless network. The traffic controller is configured to transmit, to a node of the wireless network, information indicative of a packet length for which the energy source provides sufficient power to enable reception of the packet without errors caused by reduction in output voltage of the energy source during the reception of the packet.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
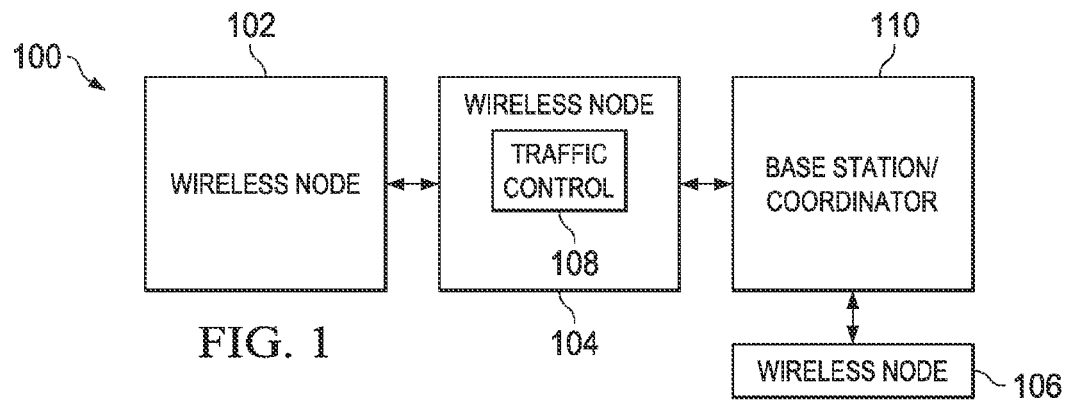
FIG. 1 shows a block diagram of an illustrative wireless network in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As devices that access wireless networks shrink in size, the physical dimensions of energy sources powering the devices also are also reduced. Where energy sources, such as AA or AAA batteries have previously been employed to power a wireless device, smaller, and possibly lower capacity, energy sources, such as coin cell batteries may be employed to reduce the size of the wireless device. Unfortunately, energy sources such as coin cell batteries may provide time varying output voltages that can result in reduced communication efficiency in a wireless network.

Embodiments of the present disclosure monitor the voltage, energy capacity, etc. of the energy source powering a wireless device, and dynamically provide traffic management based on a prediction of device capabilities supported by the present state of the energy source. For example, embodiments can restrict the length of packets transmitted by or to a wireless device based on the output voltage of the energy source powering the wireless device providing inadequate power to support longer packets without error. By providing such traffic management, embodiments extend the useful life of the wireless device by allowing for communication in power situations that would have been problematic without such management, and improve overall network efficiency by reducing packet retransmissions caused by power related errors.

FIG. 1 shows a block diagram of an illustrative wireless network 100 in accordance with various embodiments. The wireless network 100 may be a wireless network in accordance with the IEEE 802.15.4 standard (e.g., a wireless sensor network), or another wireless networking standard or technology. The wireless sensor network 100 includes a plurality of wireless devices (102, 104, 106), also referred to as wireless nodes, and a base station or coordinator 110. The base station/coordinator 110 may be similar to the wireless devices 102-106 and additionally serve in the role of a base station or coordinator. Each wireless node may communicate with neighboring wireless nodes to form an ad-hoc network in which a wireless node repeats transmissions received from other nodes to relay data through the network 100. The base station 110 receives measurement values and other information transmitted by the wireless nodes 102-106, and may provide control information to the wireless nodes 102-106. While, as a matter of convenience, FIG. 1 shows only three wireless nodes and a single base station/coordinator 110, in practice, the system 100 may include any number of wireless nodes and base stations.

The wireless node 104 includes traffic control logic 108. The traffic control logic 108 increases the operating life of the sensor node 104 and increases the efficiency of the network 100 by monitoring the condition of the energy source powering the wireless node 104, determining how the condition of the energy source affects the wireless communication capabilities of the wireless device 104, and managing communication traffic to and from the wireless device 104 based on the condition of the energy source.

Figure 2:
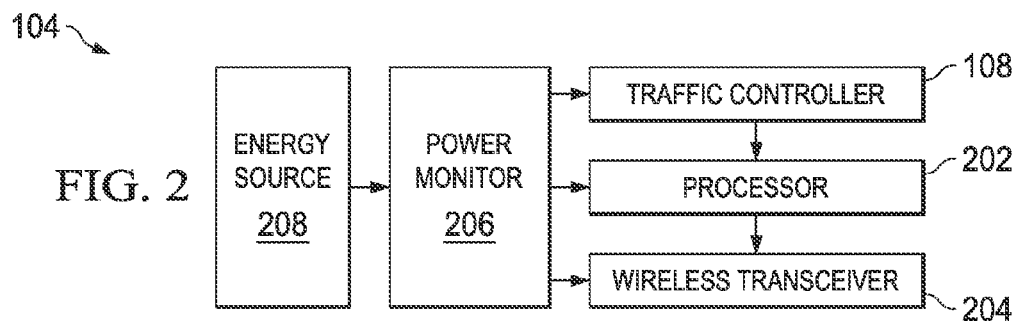
FIG. 2 shows a block diagram of a wireless device configured to access a wireless network in accordance with various embodiments.

FIG. 2 shows a block diagram of an embodiment of the wireless device 104. The wireless device 104 includes an energy source 208, a power monitor 206, a traffic controller 108, a processor 202, and a wireless transceiver 204. The energy source 208 provides power to operate the electrical components of the wireless device 104, such as the power monitor 206, the traffic controller 108, the processor 202, the wireless transceiver, etc. In some embodiments of the wireless device 104, the power source 208 may be a coin cell battery.

The power monitor 206 monitors the condition of the energy source 208. In some embodiments, the power monitor 206 may measure a parameter of the energy source 208. For example, the power monitor 206 may measure the voltage and/or current output of the energy source and/or determine the current energy capacity of the energy source 208.

The traffic controller 108 analyzes the parameter(s) of the energy source 208 provided by the power monitor 206, and determines based on the parameter(s) a packet duration/length that the wireless device 104 can transmit or receive without errors being induced in the transmitted or received data by changes in output voltage of the energy source 208. In addition to determining packet duration or length, the traffic controller 108 may also determine an idle time or spacing between packet transmissions (i.e., inter-packet interval) based on the measured energy source parameter(s). The inter-packet interval provides sufficient time for the energy source 208 to recover from a drop in output voltage. The traffic controller 108 may transmit the determined packet length and interval values to other wireless devices of the network 100 via the wireless transceiver 204.

The wireless transceiver 204 transmits and receives packets via the wireless medium by converting signals between electrical and electromagnetic forms thereby allowing the wireless device 104 to communicate with the wireless devices 102, 106, the base station 110, and other devices connected to the wireless network 100.

The processor 202 may be a general-purpose microprocessor or other instruction execution device suitable for use in a wireless device. The processor 202 executes instructions to provide data processing and control functions for the wireless device 104. In some embodiments of the wireless device 104, at least some functions of the power monitor 206 and the traffic controller 108 may be provided by the processor 202 via execution of instructions. For example, the processor 202 may compute energy source capacity and/or determine suitable packet durations or inter-packet intervals based on energy source parameters via execution of instructions encoded in a computer-readable medium, such as a memory device.

Figure 3:
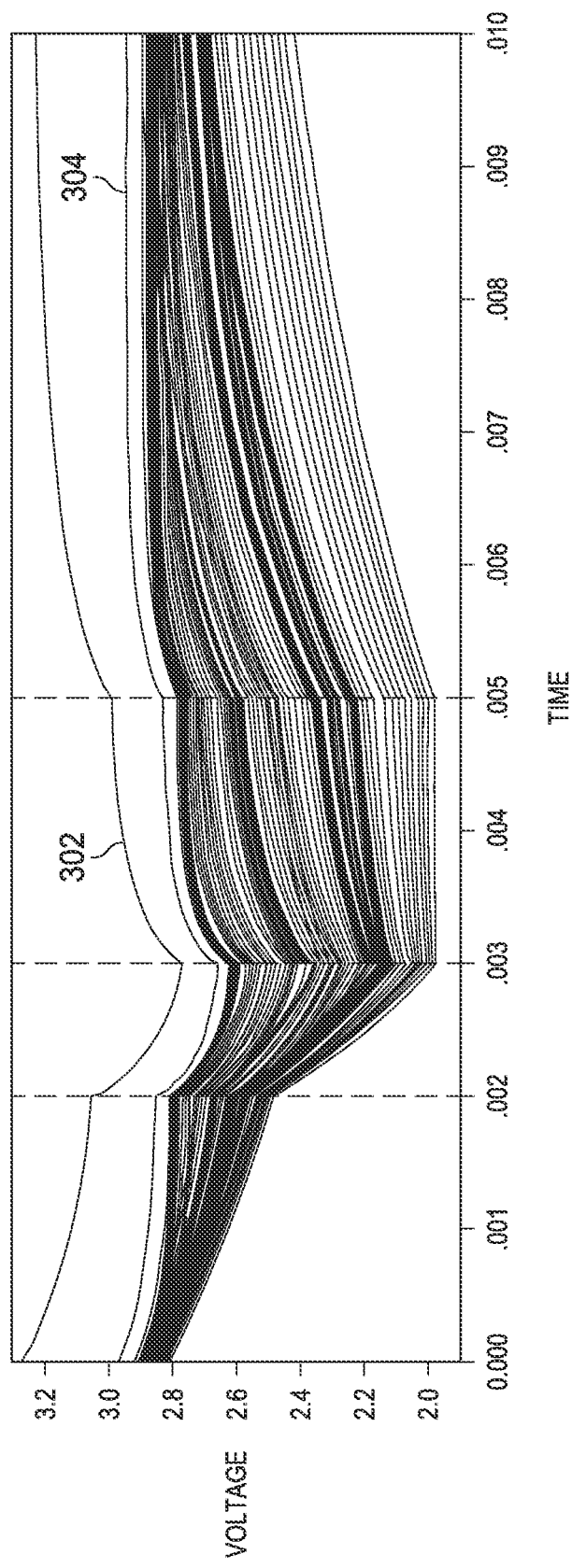
FIG. 3 shows a graph of output voltage of an energy source powering a wireless device in accordance with various embodiments.

To determine suitable packet lengths and intervals, the traffic controller 108 may also include stored information regarding the predicted output voltage provided by the energy source 208 over time at one or more current drains and one or more initial voltages or energy capacities. FIG. 3 shows an exemplary graph of output voltage of the energy source 208 powering the wireless device 104. In FIG. 3, the energy source 208 may be a coin cell battery. FIG. 3 includes voltage curves for various initial output voltage values at a constant current draw. In the examples of FIG. 3, the output voltage drops suddenly at about the 2 millisecond (ms) time, and thereafter recovers starting at about the 3 ms time. The time to recovery varies for each initial output voltage value. Other energy sources may exhibit different output voltage characteristics. The traffic controller 108 may include stored energy source voltage information for various energy source output voltage curves as shown in FIG. 3.

With reference to the exemplary output voltage curve 302, the traffic controller 108 on receiving a measurement of the initial voltage of curve 302, and based on stored information regarding the voltages of curve 302 as defined by the initial (e.g., 0 time) voltage and/or measured energy capacity of the energy source 208, may set a packet length of greater than 2 ms (e.g., 4 ms or more) anticipating that the minimum output voltage (e.g., at the 3 ms time) will be high enough to allow packet transmission/reception without errors. The traffic controller 108 may also minimize the inter-packet interval because, for voltage curve 302, no recovery time is required. Thus, if the output voltage of the energy source 208 is relatively high the traffic controller 108 allows for transmission/reception of longer packets.

In contrast to the voltage curve 302, for the exemplary output voltage curve 304, the traffic controller 108 on receiving a measurement of the initial voltage of curve 304, and based on stored information regarding the voltages of curve 304 as defined by the initial voltage and/or measured energy capacity of the energy source 208, may set a packet length of no more than 2 ms anticipating that after the 2 ms time the output voltage may be too low to allow packet transfer without errors. The traffic controller 108 may also set an inter-packet idle time that prevents initiation of a second packet transmission until the output voltage has recovered to voltage level that allows for packet transfer without errors induced by low voltage. For example, for curve 304, the traffic controller 108 may set inter-packet spacing to allow transfer of a second packet at or after the 6 ms time. Thus, when the output voltage of the energy source 208 is predicted to drop below a level needed to support reliable packet transfer, the traffic controller 108 tailors the packet length and interval to reduce voltage induced errors that may result in packet retransmissions that may reduce network efficiency and result in needless drain of the energy source 208.

Figure 4:
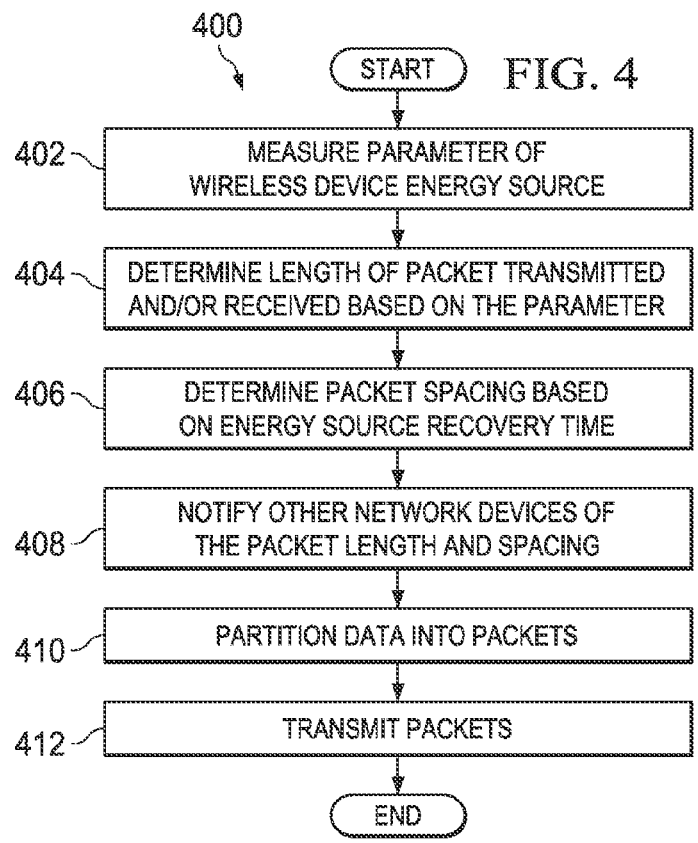
FIG. 4 shows a flow diagram for a method for power aware traffic management in a wireless network in accordance with various embodiments.

FIG. 4 shows a flow diagram for a method 400 for power aware traffic management in a wireless network 100 in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 400 can be implemented via execution of instructions stored in a computer readable medium by a processor, such as processor 202.

In block 402, the wireless device 104 measures one or parameters of the energy source 208 powering the wireless device 104. For example, the wireless device 104 may measure the output voltage and/or the current energy capacity of the energy source 208.

In block 404, the wireless device 104 determines, based on the measured parameter(s), a packet length that the wireless device 104 can transmit or receive without the data of the packet being corrupted due to a reduction in output voltage of the energy source while the packet is being transmitted or received. The packet length may be determined based on predetermined characteristics of the energy source, 208 such as output voltage data as shown in FIG. 3, current voltage or energy capacity of the energy source 208, etc.

In block 406, the wireless device 104 determines how packets should be spaced for transmission or reception. The spacing or idle time between packets transmitted or received may be set to accommodate the output voltage characteristics of the energy source 208. In some embodiments, if the output voltage of the energy source 208 is known to fall at a predetermined time after initiation of packet transfer and subsequently rise, then packet spacing may be set to allow transmission or reception of a first packet before the output voltage drops below a predetermined minimum voltage and to allow transmission or reception of a second packet after the output voltage subsequently rises above the predetermined minimum voltage. For example, referring to FIG. 3, an embodiment having a first voltage at start of first packet transmission at time 0 may complete transmission of the first packet prior to time 2 ms and delay transmission of a second packet until the output voltage recovers at least at time 6 ms. Depending on the recovery characteristics of the energy source 208, inter-packet time may be set shorter or longer.

In block 408, the wireless device 104 notifies other wireless devices of the network 100 of the determined packet length and spacing parameters. For example, the wireless device 104 may broadcast or multicast the determined packet length and spacing values for use by other wireless device in communication with the wireless device 104.

In block 410, the wireless device 104 partitions data to be transmitted into packets. The length of the packets may be no more than the predetermined packet length determined in block 404 to prevent transmission of a packet during an interval when output voltage of the energy source 208 has dropped below a predetermined level.

In block 412, the wireless device 104 transmits the packets with spacing in accordance with the packet spacing determined in block 406 to prevent transmission of a packet during an interval when output voltage of the energy source 208 has dropped below a predetermined level.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless device, comprising:
an energy source;
a power monitor coupled to the energy source and configured to measure a parameter of the energy source;
a wireless transceiver configured to wirelessly communicate via a wireless network; and
a traffic controller coupled to the power monitor and the wireless transceiver;
wherein the traffic controller is configured to set length of packets to be transmitted based on the measured parameter of the energy source and to transmit, to a node of the wireless network, information indicative of a packet length for which the energy source provides sufficient power to enable reception of the packet without errors caused by reduction in output voltage of the energy source during the reception of the packet.

2. The wireless device of claim 1, wherein the parameter comprises at least one of measured output voltage of the energy source and measured energy capacity of the energy source.

3. The wireless device of claim 1, wherein the transmission traffic controller is configured to reduce the length of the packets to be transmitted as the value of the parameter decreases.

4. The wireless device of claim 1, wherein the energy source is a coin cell battery.

5. The wireless device of claim 1, wherein the traffic controller comprises energy source output voltage information for a plurality of energy source conditions, and the traffic controller is further configured to set the length of packets based on energy source output voltage information corresponding to the measured parameter of the energy source.

6. The wireless device of claim 1, wherein the traffic controller is further configured to space packet transmissions based on recovery time of the energy source.

7. A method, comprising:
measuring, by a wireless device, a parameter of an energy source powering the wireless device;
determining, by the wireless device, based on the measured parameter of the energy source, a length of a packet to be transmitted for which the energy source provides sufficient power to enable reception of the packet without errors caused by reduction in output voltage of the energy source during the reception of the packet;
transmitting information indicative of the packet length to a node of the wireless network; and
transmitting, by the wireless device, the packet via a wireless network.

8. The method of claim 7, wherein measuring the parameter comprises at least one of measuring output voltage of the energy source and measuring energy capacity of the energy source.

9. The method of claim 7, wherein the determining comprises reducing the length of the packets to be transmitted based on the value of the parameter having decreased relative to a prior measured value of the parameter.

10. The method of claim 7, further comprising partitioning a data transmission into a number of packets, wherein the number of packets increases for a given data transmission length as the value of the parameter decreases.

11. The method of claim 7, further comprising spacing packet transmissions based on recovery time of the energy source.

12. A wireless device, comprising:
an energy source;
a power monitor coupled to the energy source and configured to measure a parameter of the energy source;
a wireless transceiver configured to wirelessly communicate via a wireless network; and
a traffic controller coupled to the power monitor and the wireless transceiver;
wherein the traffic controller is configured to transmit, to a node of the wireless network, information indicative of a packet length for which the energy source provides sufficient power to enable reception of the packet without errors caused by reduction in output voltage of the energy source during the reception of the packet.

13. The wireless device of claim 12, wherein the traffic controller is configured to set a length of a packet to be transmitted based on the measured parameter.

14. The wireless device of claim 12, wherein the parameter comprises at least one of measured output voltage of the energy source and measured energy capacity of the energy source.

15. The wireless device of claim 12, wherein the transmission controller is configured to reduce the packet length as the value of the parameter decreases.

16. The wireless device of claim 12, wherein the energy source is a coin cell battery.

17. The wireless device of claim 12, wherein the traffic controller comprises energy source output voltage information for a plurality of energy source conditions, and the traffic controller is configured to set the packet length based on energy source output voltage information corresponding to the measured parameter of the energy source.

18. The wireless device of claim 12, wherein the traffic controller is configured to space packet transmissions based on recovery time of the energy source.

* * * * *